United States Patent [19]

Brazdil, Jr. et al.

[11] Patent Number: 4,485,079

[45] Date of Patent: Nov. 27, 1984

[54] AMMOXIDATION OF METHANOL TO PRODUCE HYDROGEN CYANIDE

[75] Inventors: James F. Brazdil, Jr., Lyndhurst; Thomas G. Attig, Aurora; Robert K. Grasselli, Chagrin Falls, all of Ohio

[73] Assignee: The Standard Oil Company, Cleveland, Ohio

[21] Appl. No.: 501,671

[22] Filed: Jun. 6, 1983

Related U.S. Application Data

[63] Continuation of Ser. No. 332,060, Dec. 18, 1981, abandoned.

[51] Int. Cl.³ .................. C01C 3/02; C07C 120/14
[52] U.S. Cl. ............................. 423/376; 260/465.3
[58] Field of Search ...................... 423/376; 260/465.3

[56] References Cited

U.S. PATENT DOCUMENTS

| | | | |
|---|---|---|---|
| 2,746,843 | 5/1956 | Bellringer | 423/376 |
| 3,173,957 | 3/1965 | McDaniel et al. | 260/465.3 X |
| 3,262,962 | 7/1966 | McDaniel et al. | 260/465.3 |
| 3,316,182 | 4/1967 | McDaniel et al. | 260/465.3 X |
| 3,452,077 | 6/1969 | Caporali et al. | 260/465.3 X |
| 3,911,089 | 10/1975 | Shiraishi et al. | 260/465.3 X |

OTHER PUBLICATIONS

C.A., 85:23172b, 85:23240x, 85:179777p, Sasaki et al. (1976).
C.A., 90:206667q, 90:206671m, Saito et al. (1979).
C.A., 92:128435n, Katsuroata et al. (1980).
C.A., 91:142723r, 91:142724s, Katsumata et al. (1979).

*Primary Examiner*—Joseph Paul Brust
*Attorney, Agent, or Firm*—Charles S. Lynch; John E. Miller, Jr.; Larry W. Evans

[57] ABSTRACT

Promoted bismuth rare earth molybdenum oxide complexes are excellent catalysts for the ammoxidation of methanol to HCN especially at high methanol throughputs at contact times appropriate for fluid-bed operation.

13 Claims, No Drawings

AMMOXIDATION OF METHANOL TO PRODUCE HYDROGEN CYANIDE

BACKGROUND OF THE INVENTION

This application is a continuation of application Ser. No. 332,060 filed Dec. 18, 1981, now abandoned.

The present invention relates to a technique for preparing hydrogen cyanide by the ammoxidation of methanol, formaldehyde and/or dimethylether.

It is already known that methanol can be ammoxidized to HCN using various oxide complex catalysts. See, for example, Japanese published applications Nos.: J76-10,200, J79-76,500, J76-11,100, J76-99,700, J78-149-899, J78-149,900, J79-126,698, J79-69,597 and J79-71,799. Molybdates, antimonates and tungstats serve as catalysts in these processes.

Although these patents indicate that HCN can be produced in high yields, close examination shows that the processes are conducted under very mild conditions. As well appreciated by those skilled in catalysis, the ability of a catalyst to convert reactant into desired product decreases as the amount of reactant per unit weight of catalyst per unit time (i.e. throughput) increases. The processes described in the above noted Japanese patents have very low reactant throughputs meaning that a large amount of expensive catalyst is necessary to produce a given amount of product. Also, many of the processes are conducted at very short contact times which are unsuitable for conventional fluid-bed operation.

Accordingly, it is an object of the present invention to provide a new process for ammoxidizing methanol, formaldehyde and/or dimethylether to HCN which employs a catalyst capable of giving good yields of HCN at high reactant throughput at contact times appropriate for fluid-bed operation.

SUMMARY OF THE INVENTION

This and other objects are accomplished by the present invention which is based on the discovery that certain unpromoted and promoted bismuth rare earth molybdenum oxide complexes are excellent catalysts for the ammoxidation of methanol to HCN. Dimethylether or formaldehyde can also be ammoxidized with these catalysts at high yields and high throughputs.

Thus, the present invention provides a novel catalyst for a process for ammoxidizing a reactant selected from the group consisting of methanol, formaldehyde and dimethylether to produce HCN, the process comprising contacting the reactant, ammonia and oxygen at a temperature of 200° to 600° C. in the vapor phase with an oxide complex catalyst of the formula $$A_aD_dE_eG_gR_hMo_iO_x$$

wherein
A is alkali metal, Ag, Tl and/or Sm,
D is Cu, Fe, Th, Cr, Co, Ti, Zr and/or Hf,
E is W and/or V,
G is Bi, Te, Sb and/or Sn,
R is a rare earth metal,
wherein
a is 0 to 6,
d is 0 to 16,
e is 0 to 16,
g is 0.01 to 16,
h is 0.01 to 12,
i is 8 to 16,
x is determined by the valence requirements of the other elements present.

DETAILED DESCRIPTION

Catalysts

The catalysts employed in the inventive process are bismuth rare earth molybdate oxide complexes unpromoted or promoted with one or more additional elements. Such catalysts are well known and described inter alia in the following U.S. patents, the disclosures of which are incorporated herein by reference: U.S. Pat. Nos. 3,173,957, 3,262,962, 3,316,182 and 3,452,077.

Cerium is the preferred rare earth metal.

In general, the catalysts useful in the inventive process may be described by the following emperical formula:

$$A_aD_dE_eG_gR_hMo_iO_x \quad (1)$$

wherein
A is alkali metal, Ag, Tl and/or Sm, preferably K, Cs and/or Rb,
D is Cu, Fe, Th, Cr, Co, Ti, Zr and/or Hf, preferably Cr, Zr and/or Ti,
E is W and/or V,
G is Bi, Te, Sb and/or Sn, preferably Bi, Sb and/or Te,
R is a rare earth metal, preferably cerium, and further,
wherein
a is 0 to 6, preferably 0.01 to 2
d is 0 to 16, preferably 0 to 8,
e is 0 to 16, preferably 0 to 6,
g is 0.01 to 16, preferably 0.1 to 8,
h is 0.01 to 12, preferably 0.1 to 6,
i is 8 to 16, preferably 10 to 12, and
x is determined by the valence requirements of the other elements present.

The catalysts used in the inventive process should preferably be free of phosphorus since phosphorus exerts a negative effect on catalytic activity in this reaction. The catalysts may also be compounded free of iron, if desired.

A preferred class of catalysts are those which contain cerium as the rare earth and are promoted with at least one promoter element selected from (1) Sm or a monovalent element such as alkali metals, Tl, Ag and Cu, preferably K, Rb and/or Cs, (2) elements whose most common valence state is 4+, e.g. Te, Ti, Zr and Th, and (3) Cr, Sb and rare earths other than Ce and Sm, such as La, Y, Pr, Nd and Di. These elements can be incorporated into the bismuth cerium molybdate base systems alone or in mixtures.

These catalysts correspond to the following general formula $$R_rQ_qA_aBi_bCe_cW_dV_eMo_fO_x \quad (2)$$

wherein
A is alkali metal, Tl, Sm, Ag, Cu or mixtures thereof, preferably K, Rb, Cs or mixtures thereof,
Q is Ti, Zr, Th, Te or mixtures thereof,
R is Cr, Sb or a rare earth element other than Sm and Ce, preferaby La, Y, Pr, Nd, Di or mixtures thereof, and
wherein a is 0 to 6,
b is 0.01 to 24,
c is 0.01 to 24,
$0 \leq d+e \leq f$,
$d+e+f$ is 8 to 16,
q is 0 to 24,
r is 0 to 24,
$a+q+r>0$, and
x is a number sufficient to satisfy the valence requirements of the other elements present.

Preferably these catalysts are free of the combination of A and Te.

Preferred catalysts of this class are those in which $a+q+r \leq b+c+2$. Also preferred are catalysts which satisfy the relationship $2d+2e+2-f=a+3b+3c+4q+3r\pm z$ wherein $z \leq 10$, preferably $z \leq 4$. Of these those in which $a>0$ are especially preferred.

In this regard, catalysts of special interest are those containing Sm or a monovalent promoter, i.e. an A element and optionally Cr and/or Sb. These catalysts can be defined by the formula:

$$R_r A_a Bi_b Ce_c W_d V_e Mo_f O_x \qquad (3)$$

wherein
A is alkali metal, Tl, Sm, Ag, Cu or mixtures thereof, preferably K, Rb, Cs or mixtures thereof, and
R is Cr and/or Sb
wherein
a is greater than zero to 6,
b is 0.01 to 24,
c is 0.01 to 24,
r is 0 to 12
$0 \leq d+e \leq f$,
$d+e+f=8$ to 16, and
x is a number sufficient so that the valence requirements of the other elements present are satisfied.

Preferred catalysts of this type are those in which $b+c \leq f+d+e$, more preferably those which satisfy the relation

$$\frac{1}{2} \leq \frac{b+c}{f+d+e} \leq \frac{5}{6}$$

Of these catalysts even more preferred are those in which
$d+e+f=12$ to 12.5;
a is 0.01 to 2;
b is 1 to 11;
c is 1 to 11; and
r is 0 to 5

Still more preferred are those of the above catalysts in which a is 0.02 to less than 0.3, preferably 0.02 to 0.2.

Another interesting group of catalysts containing the monovalent A promoter is those of the above formula (3) which satisfy the relation $2d+2e+2-f=a+3b+3c+3r\pm z$, wherein $z \leq 6$, preferably $z \leq 2$.

Catalysts of formula (2) and (3) are more fully described in commonly assigned application Ser. No. 258,708, filed Apr. 29, 1981, the disclosure of which is incorporated herein by reference.

The oxide complex catalysts of the present invention can be used in unsupported form or supported on a suitable support. Any conventional support such silica, alumina, titania, zeolites, alundum, natural clays and so forth can be employed as supports. The preferred support is silica.

The catalysts of this invention can be prepared by conventional techniques such as disclosed in the patents cited above. They are most easily prepared by slurry techniques wherein an aqueous slurry containing all of the elements in the objective catalyst is produced, the water removed from the aqueous slurry to form a precatalyst precipitate or powder and the precatalyst then heated in the presence of an oxygen-containing gas such as air at elevate temperature to calcine the precatalyst thereby forming the catalyst. Liquids other than water, such as $C_1$ to $C_8$ alcohols can also be used to form the precatalyst slurry.

Ammoxidation

The present invention is most conveniently carried out using methanol as the reactant. However, it is also applicable to dimethylether, formaldehyde or any mixture of these three.

The general ammoxidation process for converting methanol to HCN is well known and described in the various Japanese published applications previously cited. In general, the ammoxidation reaction is accomplished by contacting the reactant, oxygen and ammonia with a particular catalyst in the vapor phase. The inventive reaction is carried out in the same manner generally set forth in these patents.

In a preferred aspect, the inventive process comprises contacting a mixture comprising the reactant, ammonia and oxygen with the above catalyst at elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give similar results. The molar ratio of oxygen to the reactant in the feed should be in the range of 0.5:1 to 4:1 and the ratio of about 1:1 to 3:1 is preferred.

Low molecular weight, saturated hydrocarbons do not appear to influence the reaction to an appreciable degree, and these materials can be present. Consequently, the addition of saturated hydrocarbons to the reaction feed is contemplated within the scope of this invention. Likewise, diluents, such as nitrogen and the oxides of carbon, may be present in the reaction mixture without deleterious effects.

The molar ratio of ammonia to reactant in the feed may vary between about 0.05:1 to 5:1. There is no real upper limit for the ammonia/olefin ratio, but there is generally no reason to exceed the 5:1 ratio. At ammonia/reactant ratios appreciably less that the stoichiometric ratio of 1:1, various amounts of oxygenated derivatives of the reactant will form.

Water can also be included in the feed although it is not essential. In some instances, e.g. fixed-bed systems, water may improve the selectivity of the reaction and the yield of the HCN. However, reactions not including water in the feed are also within the scope of the present invention.

In general, the molar ratio of added water to reactant, when water is added, is in the neighborhood of 0.1:1 or higher. Ratios on the order ot 1:1 to 3:1 are particularly desirable but higher ratios may be employed, i.e. up to about 10:1.

The reaction is carried out at an elevated temperature such as 200° C. to 600° C., preferably 350° C. to 500° C. The pressure at which the reaction is conducted can vary widely but is preferably at about atmospheric or slightly above atmospheric (2 to 3 atm) pressure. In general, high pressures, i.e. above 15 atm, are not desirable since higher pressures tend to favor the formation of undesirable by-products.

The apparent contact time is not critical, and contact times in the range of from 0.1 to 50 seconds may be employed. The optimal contact time will, of course, vary depending the reactant being used, but in general, contact times of from 0.5 to 15 seconds are preferred. Fluid-bed operation is the preferred operating mode and for such operation contact times on the order of 1 to 10, preferably 2 to 6, more preferably 3 to 6 seconds are appropriate.

Furthermore, the reactant throughput of the inventive process can also vary widely. For example, the throughput, measured in terms of WWH, which is defined as the weight of reactant fed per unit weight of catalyst per unit time is in general between 0.015 and 0.32, preferably 0.02 to 0.20, more preferably 0.05 to 0.1 hr.$^{-1}$. As indicated above, a significant advantage of the invention is that the catalysts of the inventive process are capable of producing HCN in high yields at high throughputs.

The inventive ammoxidation reaction is carried out in the vapor phase. Normally, the process in conducted on a continuous basis using either a fixed-bed or fluid-bed catalyst. However, a batch operation can be employed.

In a particularly preferred embodiment of the invention, methanol ammoxidation is carried out together with propylene ammoxidation in the manufacture of acrylonitrile. The ammoxidation of propylene and isobutylene to acrylonitrile and methacrylonitrile with bismuth or tellurium rare earth molybdates is described in commonly assigned application Ser. No. 258,708, filed Apr. 29, 1981, the disclosure of which is incorporated herein by reference. Propylene and isobutylene ammoxidation is carried out under essentially the same conditions as methanol ammoxidation herein, and consequently both reactions can be carried out simultaneously simply by introducing both methanol and the olefin into the same reactor.

WORKING EXAMPLES

In order to more thoroughly describe the present invention, methanol was ammoxidized in a number of experiments using various different catalysts in accordance with the invention. In each experiment, 5 cc of catalyst was contacted with a feed comprising 1 methanol/1.2 $NH_3$/10 air/2.25 water at a WWH between 0.04 and 0.17 and a temperature between 370° and 460° C. The gross reaction product was recovered and analyzed, and the amount of HCN, CO and $CO_2$ by-products determined.

The composition of the various catalysts employed, the reaction temperature and the results obtained are set forth in the following table. Unless otherwise indicated, all catalysts contain 20% $SiO_2$ as a support.

TABLE

| EX. | CATALYST | R × I | CONTACT TIME/SEC. | HCN | CO | $CO_2$ |
|---|---|---|---|---|---|---|
| 1 | $Bi_4Ce_4Mo_{12}O_x$ | 410 | 1 | 56.4 | 18.7 | 7.9 |
| 2 | $Bi_4Ce_4Mo_{12}O_x$ | 460 | 1 | 54.2 | 23.1 | 15.7 |
| 3 | $K_{0.1}Bi_4Ce_4Mo_{12}O_x$ | 410 | 1 | 75.2 | 12.2 | 8.3 |
| 4 | $K_{0.1}Bi_4Ce_4Mo_{12}O_x$ | 460 | 1 | 77.4 | 12.1 | 9.0 |
| 5 | $K_{.05}Ce_4Bi_4Mo_{10}W_2O_x$ | 410 | 1 | 71.9 | 11.0 | 8.8 |
| 6 | $K_{.05}Ce_4Bi_4Mo_{10}W_2O_x$ | 450 | 1 | 73.0 | 12.2 | 10.1 |
| 7 | $K_{.5}Bi_4Ce_4Mo_{12}O_x$ | 410 | 1 | 74.9 | 8.0 | 7.9 |
| 8 | $K_{.05}Bi_5Ce_3Mo_{10}W_2O_x$ | 410 | 1 | 75.9 | 9.2 | 7.8 |
| 9 | $Bi_7Ce_1Mo_{12}O_x$ | 405 | 1 | 52.3 | 25.0 | 13.7 |
| 10 | $Bi_2Ce_6Mo_{12}O_x$ | 405 | 1 | 46.3 | 28.3 | 11.0 |
| 11 | $Bi_2Ce_6Mo_{12}O_x$ | 420 | 1 | 47.8 | 31.7 | 12.1 |
| 12 | $Tl_{.03}Bi_4Ce_4Mo_{12}O_x$ | 415 | 1 | 70.6 | 12.5 | 7.4 |
| 13 | $K_{.05}Cs_{.02}Bi_4Ce_4Mo_{12}O_x$ | 410 | 1 | 15.0 | 18.4 | 52.9 |
| 14 | $Cs_{.02}Bi_4Ce_4Mo_{12}O_x$ | 410 | 1 | 63.7 | 15.7 | 8.6 |
| 15 | $K_{.1}Bi_5Ce_3Mo_{12}O_x$ | 410 | 1 | 75.4 | 8.6 | 9.0 |
| 16 | $K_{.1}Bi_3Ce_5Mo_{12}O_x$ | 415 | 1 | 60.7 | 15.2 | 9.6 |
| 17 | $Cs_{.1}Bi_4Ce_4Mo_{12}O_x$ | 410 | 1 | 48.8 | 2.0 | — |
| 18 | $K_{.1}Bi_5Ce_3Mo_{12}O_x$ | 450 | 1 | 62.4 | 7.6 | 16.4 |
| 19 | $K_{.1}Bi_5Ce_3Mo_{12}O_x$ | 425 | 1 | 73.4 | 9.0 | 7.7 |
| 20 | $Ce_{4.5}Bi_{4.5}PMo_{12}O_x$ | 410 | 1 | 28.6 | 24.3 | 38.7 |
| 21 | $Cs_{.1}Bi_4Ce_4Mo_{12}O_x$ | 450 | 1 | 23.8 | 8.2 | 42.9 |
| 22 | $K_{.05}Bi_5Ce_3Mo_{12}O_x$ | 410 | 1 | 71.4 | 11.3 | 7.9 |
| 23 | $K_{.1}Bi_5Ce_3Mo_{12}O_x$ | 410 | 1 | 70.0 | 9.8 | 9.2 |
| 24 | $K_{.1}Bi_5Ce_3Mo_{10}W_2O_x$ | 415 | 1 | 76.3 | 8.1 | 9.1 |
| 25 | $K_{.1}Bi_6Ce_4Mo_{12}O_x$ | 410 | 1 | 63.6 | 5.6 | 9.0 |
| 26 | $Cs_{.1}Bi_4Ce_4Mo_{12}O_x$ | 410 | 2 | 69.1 | 2.8 | 3.5 |
| 27 | $Cs_{.1}Bi_4Ce_4Mo_{12}O_x$ | 425 | 2 | 78.1 | 2.7 | 3.5 |
| 28 | $Cs_{.1}Bi_4Ce_4Mo_{12}O_x$ | 455 | 2 | 78.6 | 3.3 | 5.8 |
| 29 | $K_{.1}Bi_5Ce_3Mo_8W_4O_x$ | 415 | 2 | 65.9 | 10.1 | 4.5 |
| 30 | $K_{.1}Bi_5Ce_3Mo_{12}O_x$ | 415 | 2 | 64.1 | 14.2 | 6.2 |
| 31 | $Cs_{.1}Bi_4Ce_4Mo_{12}O_x$ | 410 | 3 | 80.6 | 3.4 | 6.4 |
| 32 | $Cs_{.1}Bi_4Ce_4Mo_{12}O_x$ | 410 | 4 | 80.1 | 4.4 | 16.6 |
| 33 | $Cs_{.15}Bi_4Ce_4Mo_{12}O_x$ | 410 | 4 | 76.3 | 2.8 | 12.5 |
| 34 | $Cs_{.1}Bi_5Ce_3Mo_{12}O_x$ | 405 | 4 | 72.4 | 2.4 | 9.9 |
| 35 | $Cs_{.1}Bi_5Ce_3Mo_{12}O_x$ | 408 | 3 | 72.7 | 2.4 | 6.9 |
| 36 | $Cs_{.15}Bi_5Ce_3Mo_{12}O_x$ | 410 | 3 | 71.8 | 2.7 | 12.3 |
| 37 | $K_{.1}La_4Bi_4Mo_{12}O_x$ | 410 | 1 | 55.9 | 8.8 | 35.3 |
| 38 | $K_{.1}La_4Bi_4Mo_{12}O_x$ | 370 | 1 | 58.8 | 12.7 | 9.2 |

From the foregoing table, it can be seen that various bismuth rare earth molybdate oxide complexes provide excellent yields of HCN in the ammoxidation of methanol carried out at high throughput.

Comparative Example A

Example 6 of Japanese Pat. No. J79-126,698 shows ammoxidizing methanol using a catalyst comprising 50% $K_{0.006}Bi_{0.45}Fe_{0.65}P_{0.1}MoO_x$—50% Si(50% $K_{0.07}Fe_{7.8}Bi_{5.4}P_{1.2}Mo_{12}O_x$—50% $SiO_2$). Methanol conversion is reported as 97.8% and HCN yields are reported as 93.1%. However, the reactant mix of 1 $CH_3OH/1.35\ NH_3/1.5\ O_2/1\ H_2O$ is diluted with helium so that the gross reactant mix is composed of 97% helium and only 3% of the above reactants. This translates to a WWH of about 0.017. Also, the contact time was only 1 second. Operating with such a great amount of diluent at such low WWH is unfeasible on a commercial basis. Also, such short contact times are suitable only for fixed bed reactions where the advantage of fluid-bed operation are lost.

The above catalysts was tested under more rigorous conditions wherein a feed comprising 1 $CH_3OH/1.2\ NH_3/10\ Air/2.25\ H_2O$ was contacted with 5 cc of the catalyst at 410° C. at a contact time of 1 second and a WWH of 0.17. Under these conditions of much higher throughput, the HCN yields wer only 70.0%. This shows that the capability of the catalyst to produce HCN drops off significantly when the reactant throughput is increased to commercially feasible levels.

EXAMPLE 39

A feed comprising 1 propylene/0.4 methanol/2.4 $NH_3/4.0\ O_2/2.2\ N_2/7\ H_2O$ was contacted with a catalyst comprising $Cs_{0.05}Bi_4Ce_4Mo_{10}W_2O_x$—50% $SiO_2$ at 460° C. at a contact time of 3 seconds. The gross reaction product was recovered and it was found that the acrylonitrile yield was 64% and the HCN yield was 6%.

Although only a few embodiments of the invention have been illustrated above, it should be appreciated that many modifications can be made without departing from the spirit and scope of the invention. All such modifications are intended to be included within the scope of the present invention, which is to be limited only by the following claims:

We claim:

1. A process for ammoxidizing a reactant selected from the group consisting of methanol, formaldehyde and dimethyl ether to produce HCN, said process comprising contacting said reactant, ammonia and oxygen at a temperature of 200° to 600° C. in the vapor phase with an iron and phosphorus free oxide complex catalyst of the formula:

$$R_rA_aBi_bCe_cW_dV_eMo_fO_x$$

wherein
A is alkali metal, Tl, Sm, Ag, Cu or mixtures thereof, and
R is Cr and/or Sb,
wherein
a is 0.01 to 2,
b is 1 to 11,
c is 1 to 11,
r is 0 to 5,
$0 \leq d+e \leq f$,
d+e+f=12 to 12.5, $$\frac{1}{2} \leq \frac{b+c}{f+d+e} \leq \frac{5}{6},$$

and x is a number sufficient so that the valence requirements of the other elements present are satisfied.

2. The process of claim 1 wherein b/c is about 5/3 to about 3/5.

3. The process of claim 2 wherein

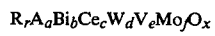

is about 8/12

4. The process of claim 3 wherein A is at least K, Cs and/or Tl.

5. The process of claim 2 wherein A is at least K, Cs and/or Tl.

6. The process of claim 5 wherein the reaction temperature is 400° to 460° C. and the reactant is methanol.

7. The process of claim 6 wherein propylene is also contacted with said catalyst so that methanol and propylene are simultaneously ammoxidized to HCN and acrylonitrile, respectively.

8. The process of claim 1 wherein the catalyst contains 0.01 to 2 atoms of cesium and the contact time is at least 2 seconds.

9. The process of claims 8 wherein the A element is solely Cs.

10. A process for ammoxidizing methanol to produce HCN, said process comprising contacting methanol, ammonia and oxygen at a temperature of 350° to 500° C. in the vapor phase with an essentially phosphorus free oxide complex catalyst of the formula:

$$R_rA_aBi_bCe_cW_dV_eMo_fO_x$$

wherein
A is one or more of K, Cs and Tl, and can optionally also include an alkali metal other than K and Cs, Sm, Ag of mixtures thereof;
R is Cr and/or Sb, and
wherein
a is 0.01 to 2,
b is 1 to 11,
c is 1 to 11,
r is 0 to 5,
$0 \leq d+e \leq f$,
d+e+f=12 to 12.5, $$\frac{1}{2} \leq \frac{b+c}{f+d+e} \leq \frac{5}{6},$$

and x is a number sufficient so that the valence requirements of the other elements present are satisfied.

11. The process of claim 10 wherein propylene is also contacted with said catalyst so that methanol and propylene are simultaneously ammoxidized to HCN and acrylonitrile, respectively.

12. The process of claim 10 wherein the catalyst contains 0.01 to 2 atoms of cesium and the contact time is at least 2 seconds.

13. The process of claims 12 wherein the A element is solely Cs.

* * * * *